(12) United States Patent
Parker et al.

(10) Patent No.: US 10,885,577 B2
(45) Date of Patent: Jan. 5, 2021

(54) SYSTEM AND METHOD FOR RETAIL SPACE MANAGEMENT

(71) Applicant: Walmart Apollo, LLC, Bentonville, AR (US)

(72) Inventors: Jon Parker, Bentonville, AR (US); Steven J. Clark, Bella Vista, AR (US); Ian Townsend, Rogers, AR (US); Jyoti Prakash Malik, Bentonville, AR (US); Kehinde S. Onadipe, Bentonville, AR (US); John Wynn Plummer, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 467 days.

(21) Appl. No.: 15/625,273

(22) Filed: Jun. 16, 2017

(65) Prior Publication Data
US 2017/0364994 A1    Dec. 21, 2017

Related U.S. Application Data (60) Provisional application No. 62/351,435, filed on Jun. 17, 2016.

(51) Int. Cl.
*G06Q 30/00* (2012.01)
*G06Q 30/06* (2012.01)

(52) U.S. Cl.
CPC ..... *G06Q 30/0643* (2013.01); *G06Q 30/0625* (2013.01)

(58) Field of Classification Search
None
See application file for complete search history.

(56) References Cited

U.S. PATENT DOCUMENTS

| 6,026,377 | A | 2/2000 | Burke |
| 7,287,001 | B1 * | 10/2007 | Falls ............ G06Q 10/087 |
| | | | 235/383 |

(Continued)

FOREIGN PATENT DOCUMENTS

| WO | 2003091865 | 11/2003 |

OTHER PUBLICATIONS

City University of Hong Kong; patent issued for automatic switching of a multi-mode display for displaying three-dimensional and two-dimensional images. (Jun. 10, 2015). Journal of Engineering Retrieved from https://dialog.proquest.com/professional/docview/1685239397?accountid=161862 (Year: 2015).*

(Continued)

*Primary Examiner* — Marissa Thein
*Assistant Examiner* — Ashley D Preston
(74) *Attorney, Agent, or Firm* — Fitch, Even, Tabin & Flannery LLP (57) ABSTRACT

In some embodiments, systems, apparatuses, and methods are provided herein useful to manage a retail space. In some embodiments, cubic product representations within the retail location are provided herein which represent the actual space and location of products within the store. Data for the retail space, such as blueprint, floorplan, and item modular data, can be merged and transformed into a central database to create the cubic product representations. Further, the cubic product representations within the retail location can be provided to users through a user interface, such as a web viewer.

19 Claims, 12 Drawing Sheets

(56) References Cited

U.S. PATENT DOCUMENTS

| | | | |
|---|---|---|---|
| 2003/0033217 A1 | 2/2003 | Cutlip | |
| 2004/0085293 A1 | 5/2004 | Soper | |
| 2004/0113937 A1 | 6/2004 | Sawdey | |
| 2007/0083329 A1 | 4/2007 | Im | |
| 2008/0183483 A1 | 7/2008 | Hart | |
| 2008/0263088 A1 | 10/2008 | Webster | |
| 2008/0301102 A1 | 12/2008 | Liang | |
| 2009/0079730 A1* | 3/2009 | Lee | G06T 3/4038 345/419 |
| 2011/0011936 A1* | 1/2011 | Morandi | G06K 9/00 235/454 |
| 2011/0015966 A1* | 1/2011 | Wasco | G06Q 10/0637 705/7.36 |
| 2013/0166408 A1 | 6/2013 | Edwards | |
| 2015/0324725 A1* | 11/2015 | Roesbery | G06Q 30/0639 705/7.39 |
| 2016/0247219 A1* | 8/2016 | Sorensen | G06F 16/9535 |

OTHER PUBLICATIONS

Hicks, Dylan et al.; "SmartMart: IoT-based In-store mapping for mobile devices"; http:// ieeexplore.ieee.org/document/6680033/?arnumber=6680033&queryText=.QT.spatial%20database.QT.%20item%20data%20.LB..QT.floor%20plan.QT.%20or%20blueprint.RBAnewsearch=true; Retrieved on Feb. 18, 2016; pp. 1-2.

Patel, Meghna; "Retail Store Navigation"; https://jamesdysonaward.org/en-GB/projects/retail-store-navigation-an-app-for-modern-shoppers/; Retrieved on Feb. 18, 2016 2; pp. 1-4.

PCT; App. No. PCT/US17/036516 ; International Search Report and Written Opinion dated Aug. 16, 2017.

* cited by examiner

FIG. 12

SYSTEM AND METHOD FOR RETAIL SPACE MANAGEMENT

CROSS-REFERENCE TO RELATED APPLICATIONS

This application claims the benefit of U.S. Provisional Application No. 62/351,435, filed Jun. 17, 2016, which is hereby incorporated by reference herein in its entirety.

TECHNICAL FIELD

This invention relates generally to use and layout management of retail space.

BACKGROUND

When designing the layout of a retail location, users can typically manage every portion of the retail space. Management can include the placement of many different types of product displays, as well as the placement of the products themselves. Often, management of a retail space includes utilizing several different computer programs, which can require frequently switching between the programs and can result in lengthy updating times when the data is edited.

Additionally, retail locations have provided product searches utilizing one or more computer programs. Unfortunately, these product searches are limited to overhead two-dimensional views of the retail location and can only identify a general area where the product should be located. Such general search results can still require a customer to search for the actual location of the product.

BRIEF DESCRIPTION OF THE DRAWINGS

Disclosed herein are embodiments of systems, apparatuses and methods pertaining management of a retail space. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to manage a retail space. More specifically, the embodiments described herein can be used for planning retail space layout and execution, providing maps of the retail location in electronic form, locating individual items within the retail location, planning layout of product displays, and auditing retail space fixtures to name a few.

To achieve various ones of these functionalities, cubic product representations within the retail location are provided herein which represent the actual space and location of products within the store. Data for the retail space, such as blueprint, floorplan, and item modular data, can be merged and transformed into a central database to create the cubic product representations. The data merge uses geometry data points, such as from the blueprint and floorplan data, to create an accurate to the inch map of every product within a virtual retail space of the retail location. Further, the cubic product representations within the retail location can be provided to users through a user interface, such as a web viewer.

In some embodiments, the cubic product representations provide a three-dimensionally accurate product search. In several embodiments, a single platform is provided to make edits to any of the data forming the cubic product representations. In further embodiments, the single platform can automatically update the data in any secondary systems originally providing the data. In some embodiments, a virtual representation of a product display unit can be provided to a user showing products stocked thereon. In further embodiments, images of the products can be utilized showing product locations within the virtual retail space, which represent actual stocking locations.

Figure 1:
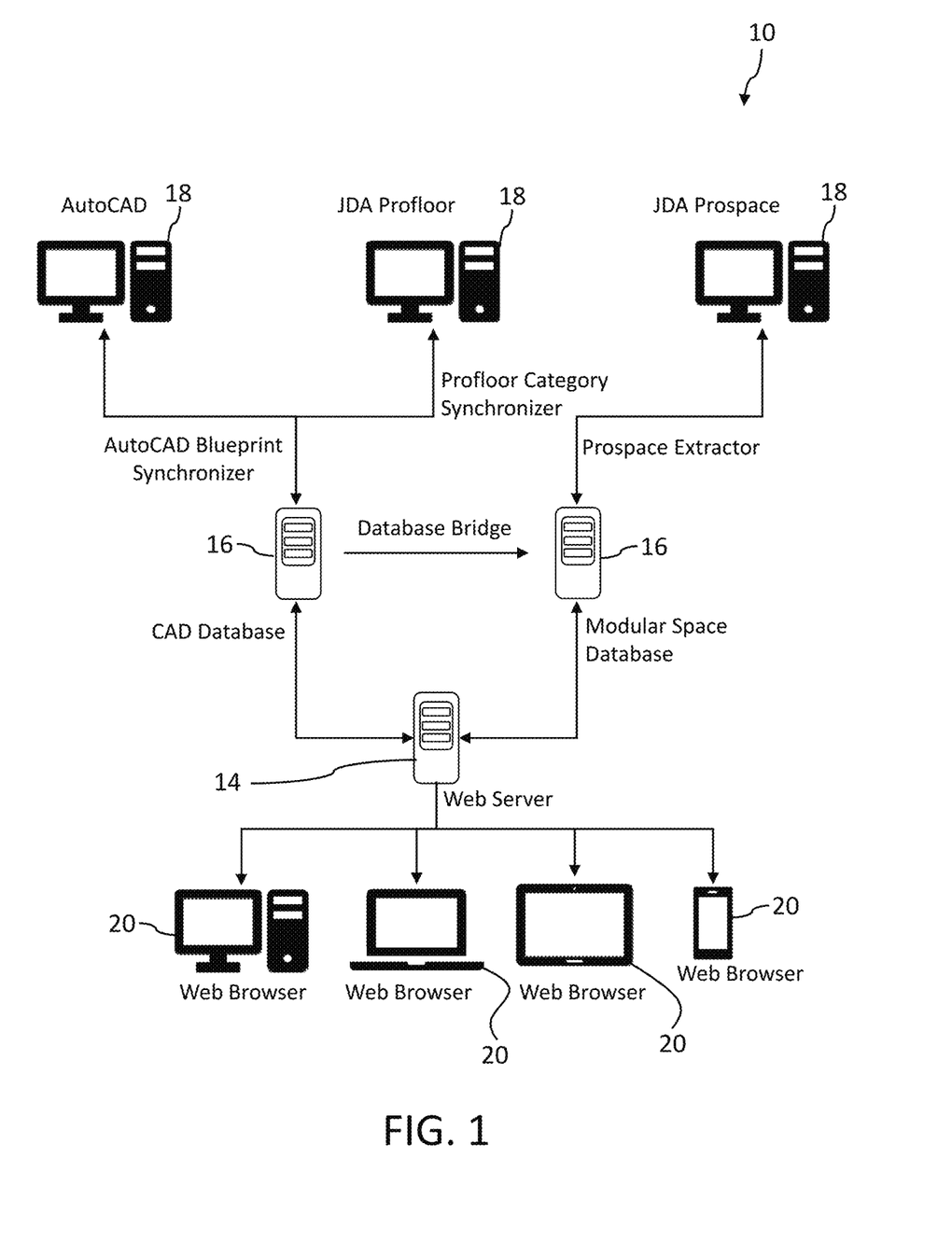
FIG. 1 is a diagrammatic view of system architecture in accordance with some embodiments.

An example system architecture is shown in FIG. 1. As illustrated, a retail space management system 10 for a retail location 12 includes a control circuit 14 and a central database or databases 16. The control circuit 14 and central database 16 receive data from one or more secondary systems 18, which can include two-dimensional retail space data, such as blueprint data and layout data, spatial data, such as product display data, modular data, product dimensional data, and product location data. Although three secondary systems 18 are shown, this is for clarity only, and any number of secondary systems can be utilized.

In one example, the secondary systems 18 can include a modeling program, such as AutoCAD, to create a shell for the retail location 12, set out fixture placement within the retail location 12, and allocate department space. In another example, the secondary systems 18 can include a program for category space allocation, such as JDA Profloor or the like. In yet another example, the secondary systems 18 can include a program for modular and product space allocation, such as JDA Prospace or the like.

All of this data can then be exported to the central database 16. In order to provide the cubic product representations as described herein, the control circuit 14 merges and transforms the data. More specifically, the control circuit 14 applies custom calculations to the data to match the product spatial data to the product location within the product display as installed according to the blueprint for each retail location 12 so that the cubic product representations accurately reflect the actual retail location 12 in a fully stocked configuration.

By one approach, to merge and transform the data, the control circuit 14 resolves each blueprint category space of width, height, and length to a corresponding modular (the layout of products for a given category or grouping within the retail location and intended product locations on shelves or other product displays) of equal dimensions and an optional assortment identifier (such as regional or local products, seasonal products, or other differences in products for the retail location). The optional assortment identifier applies product differences as a trait in the resolution while accounting for multiple iterations or variations of the same width, height, and length. The resolution further takes into account breaks or discontinuities of product categories due to store layout, product display configurations, or the like. For example, products within a category can be disposed on both sides of a gondola, so while the modular may not identify the split, resolving the modular with the blueprint correctly locates the products on both sides of the gondola. Similar analysis can be achieved with categories spanning multiple shelves, multiple product displays, multiple aisles, or the like. The modular is parsed out to get geometry dimensions for components therein, such as product displays and products.

The control circuit 14 then calculates the rotation and offset of the modular per a rotation and insertion point of the category in the blueprint. For example, when viewed from a top blueprint view, a given category may be disposed in the middle of the retail location and the insertion point of the modular would coincide with that category. Further, for each facing of a product in the modular, the control circuit 14 translates and rotates each point in the geometry collection of the product per the offset and insertion point of the blueprint. In the above example, with a given category in the middle of the retail location, when viewed from a product display perspective, the insertion point has to be redefined with regard to the product display. In the case of a shelf or gondola, the bottom left (or other corner or location) can be defined as the origin (or (0,0)) with each product facing having insertion points based on the origin. Further, insertion points can be defined for multiple locations, such as both sides of a gondola.

Stated another way, the control circuit 14 rotates and moves a product category to the corresponding location of the category in the blueprint. The control circuit 14 then recalculates the components (such as the shelving layout, product dimensions, etc.) within the modular to calculate to the inch where each product facing is located.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 14 may be configured (for example, by using corresponding programming stored in a memory as will be well understood by those skilled in the art) to carry out one or more of the steps, actions, and/or functions described herein.

Advantageously, the control circuit 14 can provide the cubic product representations to users operating user devices 20. The user devices 20 can be any suitable computing device, including any stationary computers or mobile devices, such as laptops, telephones, tablets, or other connected devices.

Figure 2:
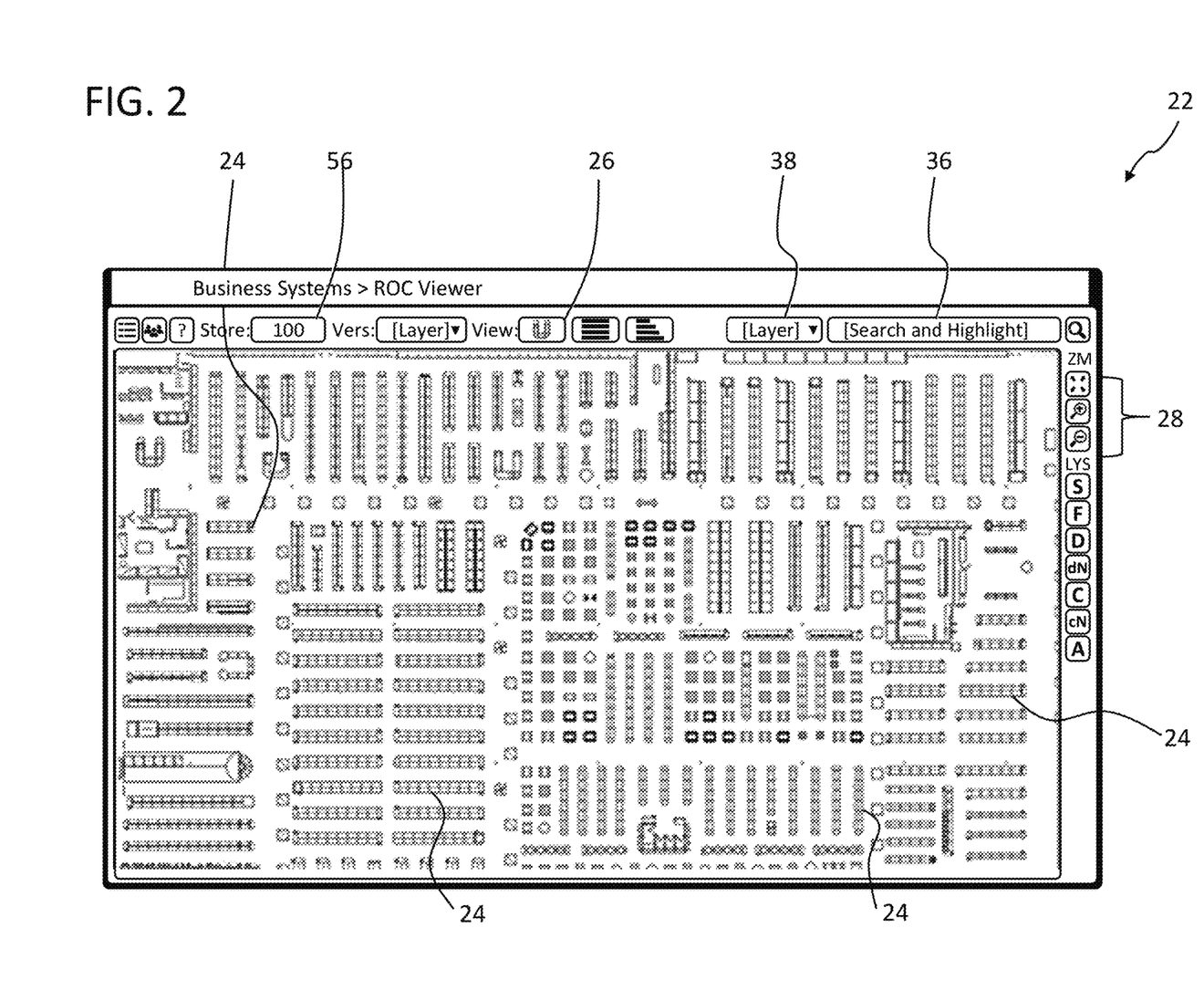
FIG. 2 is a graphical user interface in accordance with several embodiments.

When accessed by a user operating one of the user devices 20, one or more graphical user interfaces (GUIs) can be presented to the user on a screen of the user device 20. The GUIs can provide several different virtual views of the retail location 12. In one form, a user can select an overhead view of the retail location 12, such as by selection of an icon or switch 26. As shown in FIG. 2 in a first example, a GUI 22 can display a blueprint layout of the retail location 12 identifying the locations of the various product displays 24, such as modular shelving units, coolers, refrigerators, end caps, temporary displays, and the like. This view can further be zoomed in, or out, such as by selection of icons 28 or other user inputs, including, for example, selection of a desired zoom area, sliding input to a touch screen, or the like, to show the product displays 24 in greater detail, like that shown in an example GUI 29 in FIG. 3.

Figure 3:
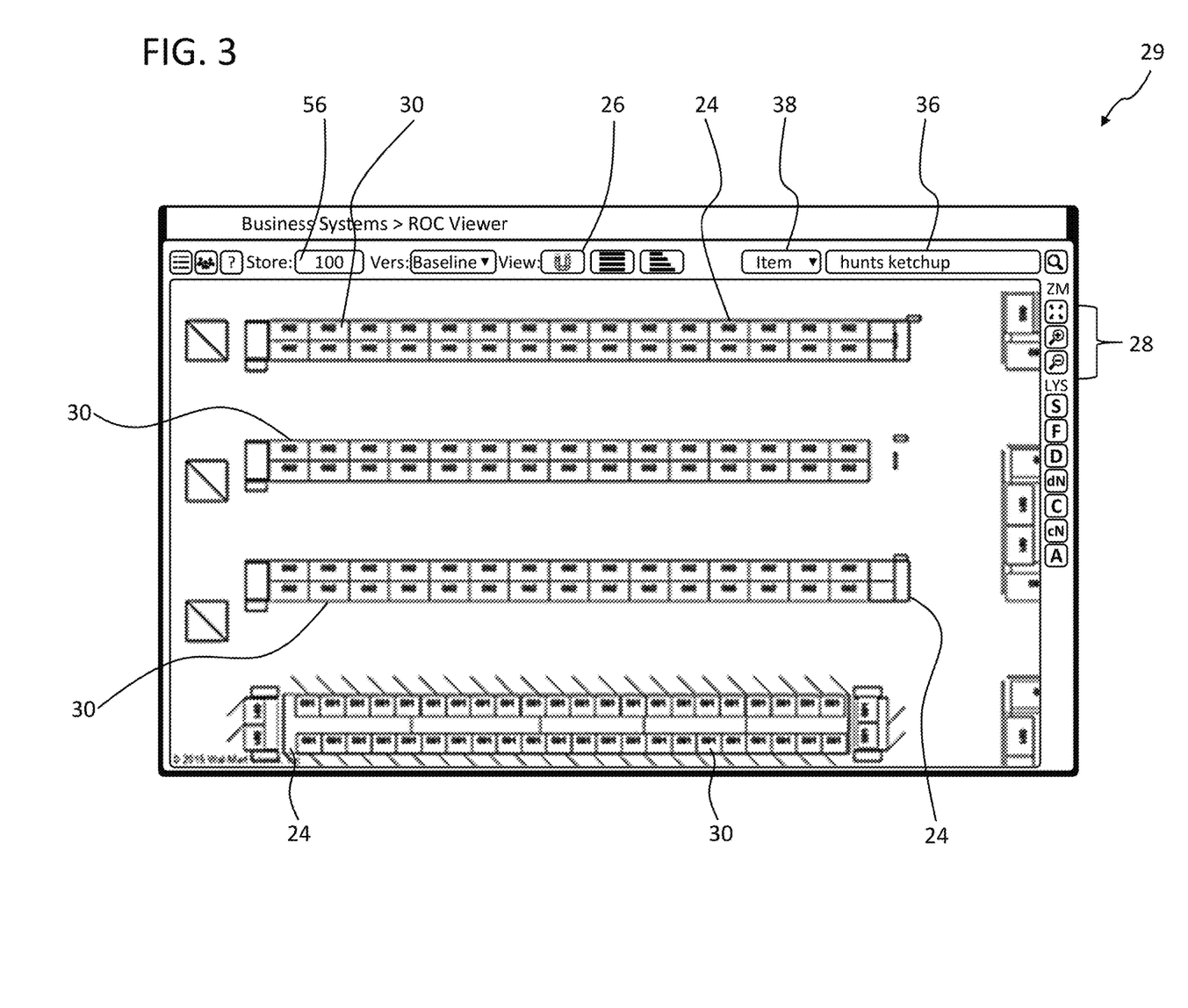
FIG. 3 is a graphical user interface in accordance with some embodiments.

By one approach, these views can be used to identify the divided portions 30 of the product displays 24, which can refer to individual shelving units or portions thereof, such as that shown in the GUI 29 of FIG. 3. By another approach, these views can be used to show product categories, such as that shown in an example GUI 31 in FIG. 4. As illustrated, the product displays 24 are broken into product category portions 32, such as salad dressing, coffee, tea, and the like. This functionality can be used by a customer to generally identify where a type of product 34 is located within the retail location 12. This functionality can further be utilized by an employee to visually see how much a given product category 32 takes up on the product display 24. As such, the GUI 31 can be utilized to organize and manage product locations to optimize space. For example, an employee can easily determine whether a given product category 32 would fit in a different location or the like.

Figure 6:
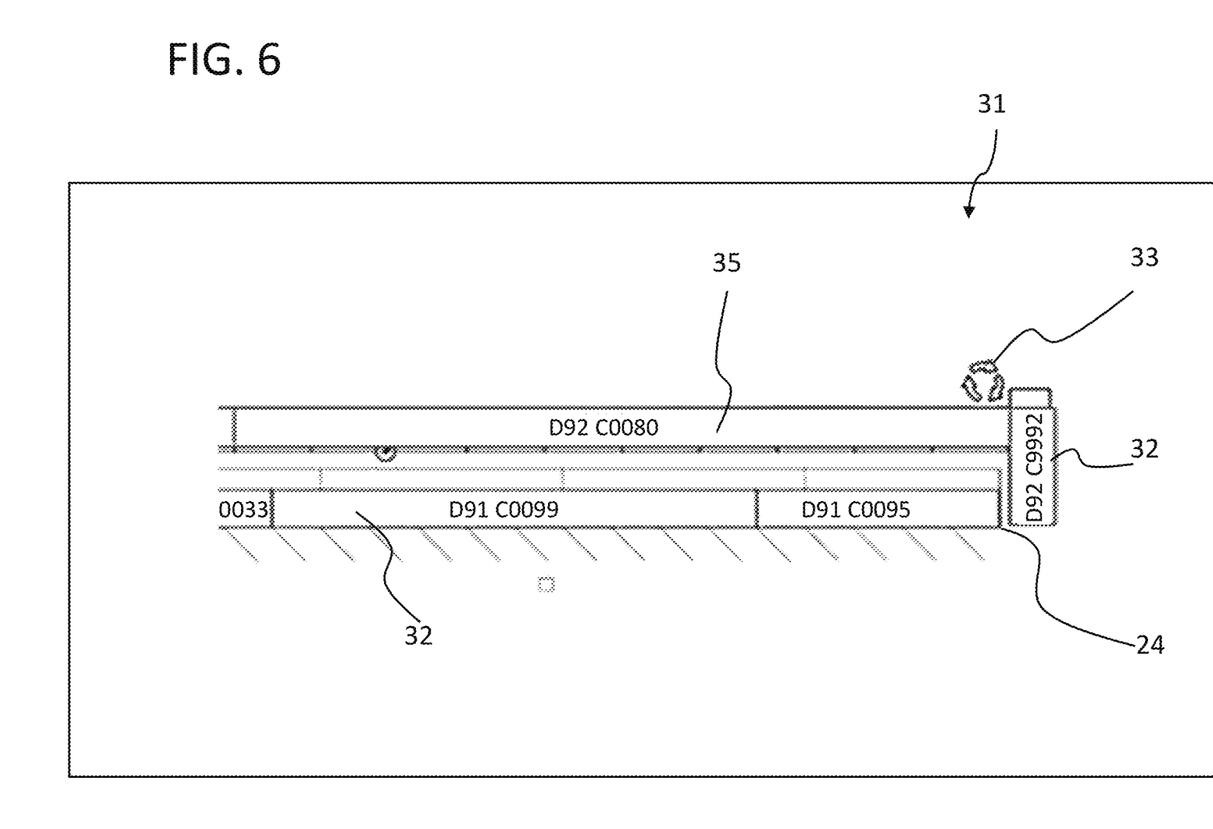
FIG. 6 is a graphical user interface in accordance with several embodiments.
Figure 7:
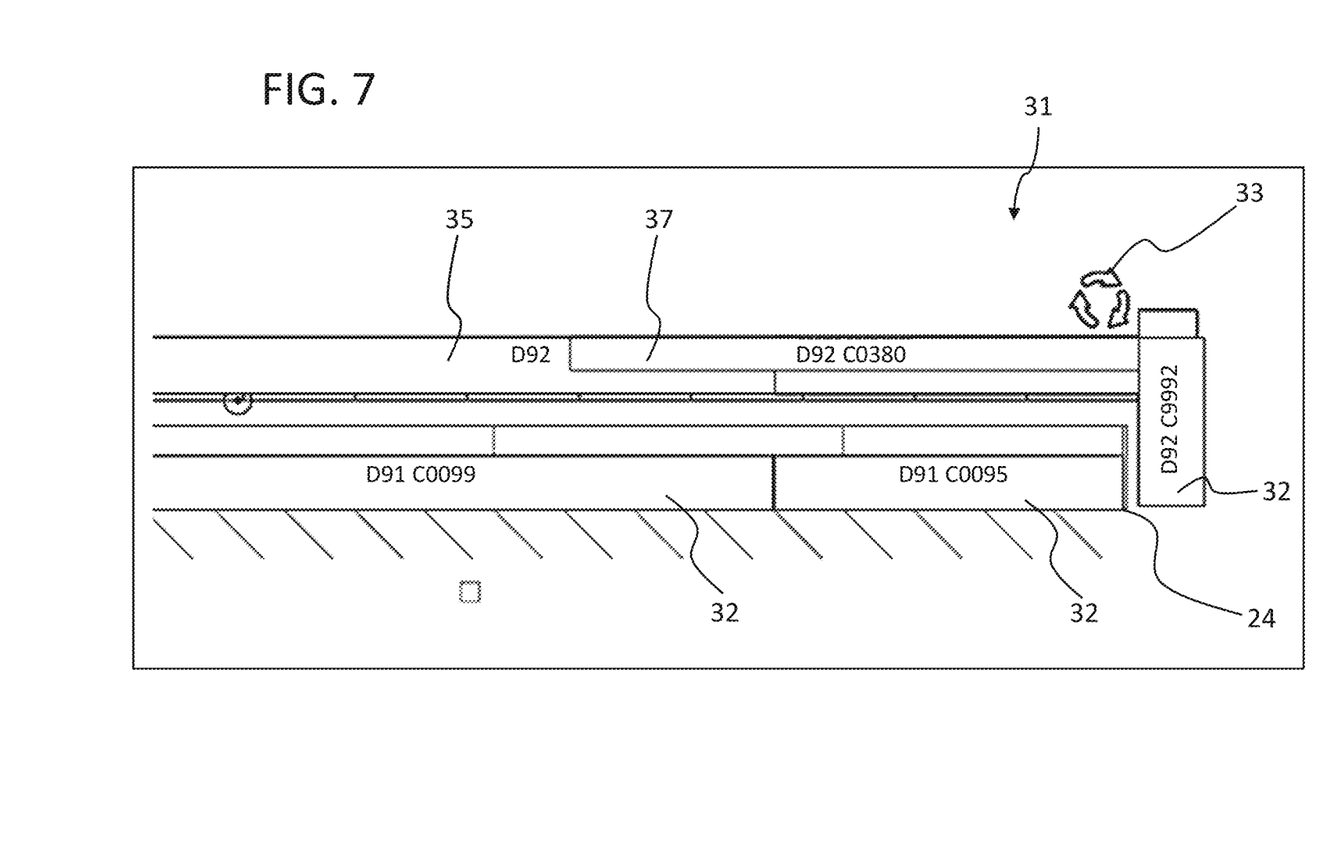
FIG. 7 is a graphical user interface in accordance with some embodiments.

If desired, as shown in FIGS. 6 and 7, the GUI 31 can include the functionality to show multiple categories 32 that occupy the same horizontal space on a display 24 from a top plan view perspective. The multiple categories 32 can occupy the same horizontal space due to due to stacked shelving and the like. By a first approach, the GUI 31 can include an icon 33 adjacent to a product display 24 to indicate that another product 34 or category 32, other than that shown, is present at the location and available for viewing in the GUI 31. In this approach, a primary category or product 35 is initially displayed, but the icon 33 indicates to the user that a secondary category or product 37 within that product display 24 or horizontal area is hidden from view. When the icon 35 is selected by the user, the secondary category or product 37 is displayed, as shown in FIG. 7. The secondary category or product 37 can be displayed on top of the primary category or product 35 as shown, or can replace the primary category or product 37 in the applicable horizontal space. Of course, a second selection of the icon 35 can bring the display back to the primary category or product 35. By other approaches, the GUI 31 can simply display the categories or products 35, 37 by splitting the available product display space, by displaying the secondary category or product 37 in a pop-out window, extending the secondary category or product 37 display into a space adjacent to the product display 24, overlapping edges of the product display 24, and so forth, such that all necessary information is provided to the user.

Figure 4:
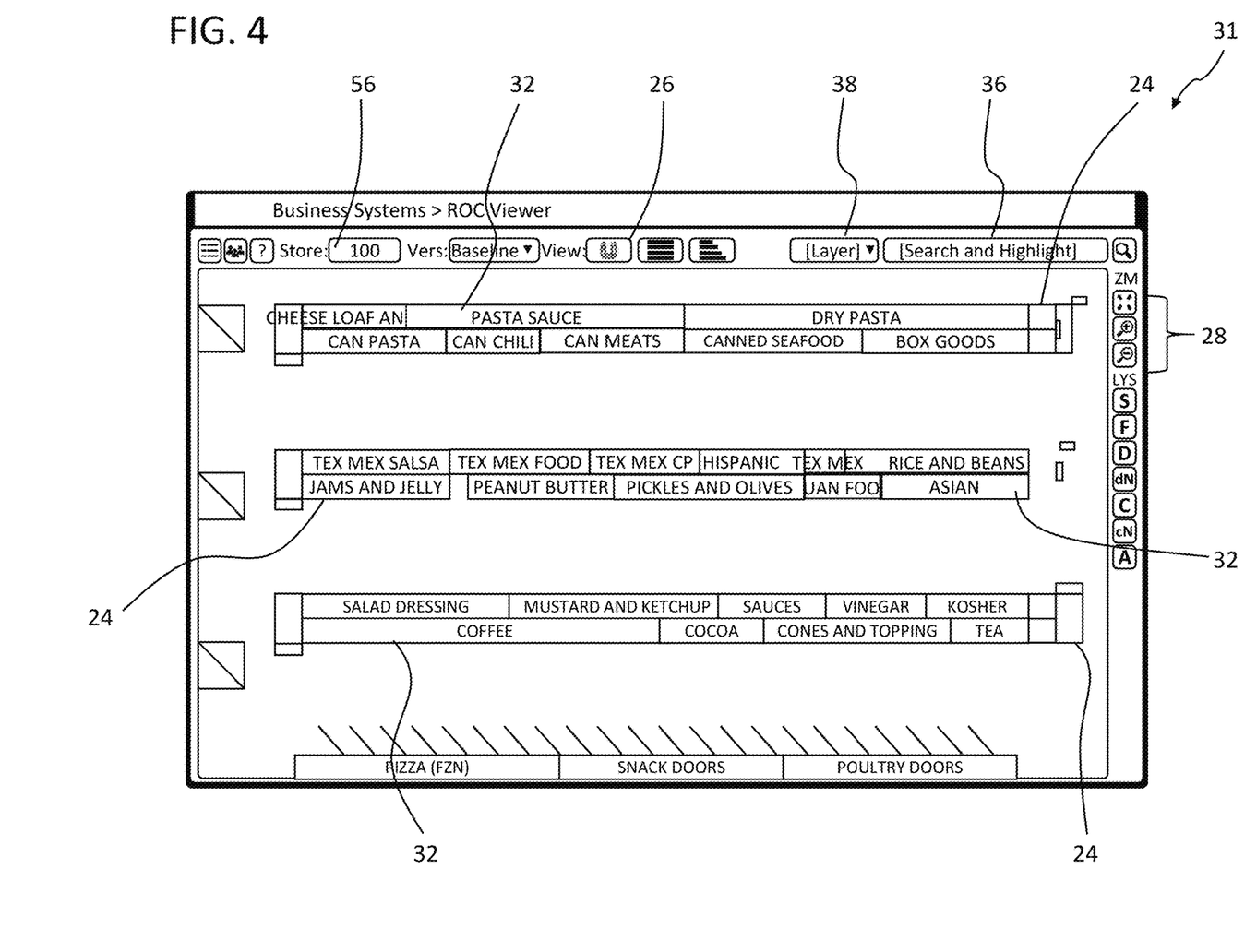
FIG. 4 is a graphical user interface in accordance with several embodiments.
Figure 5:
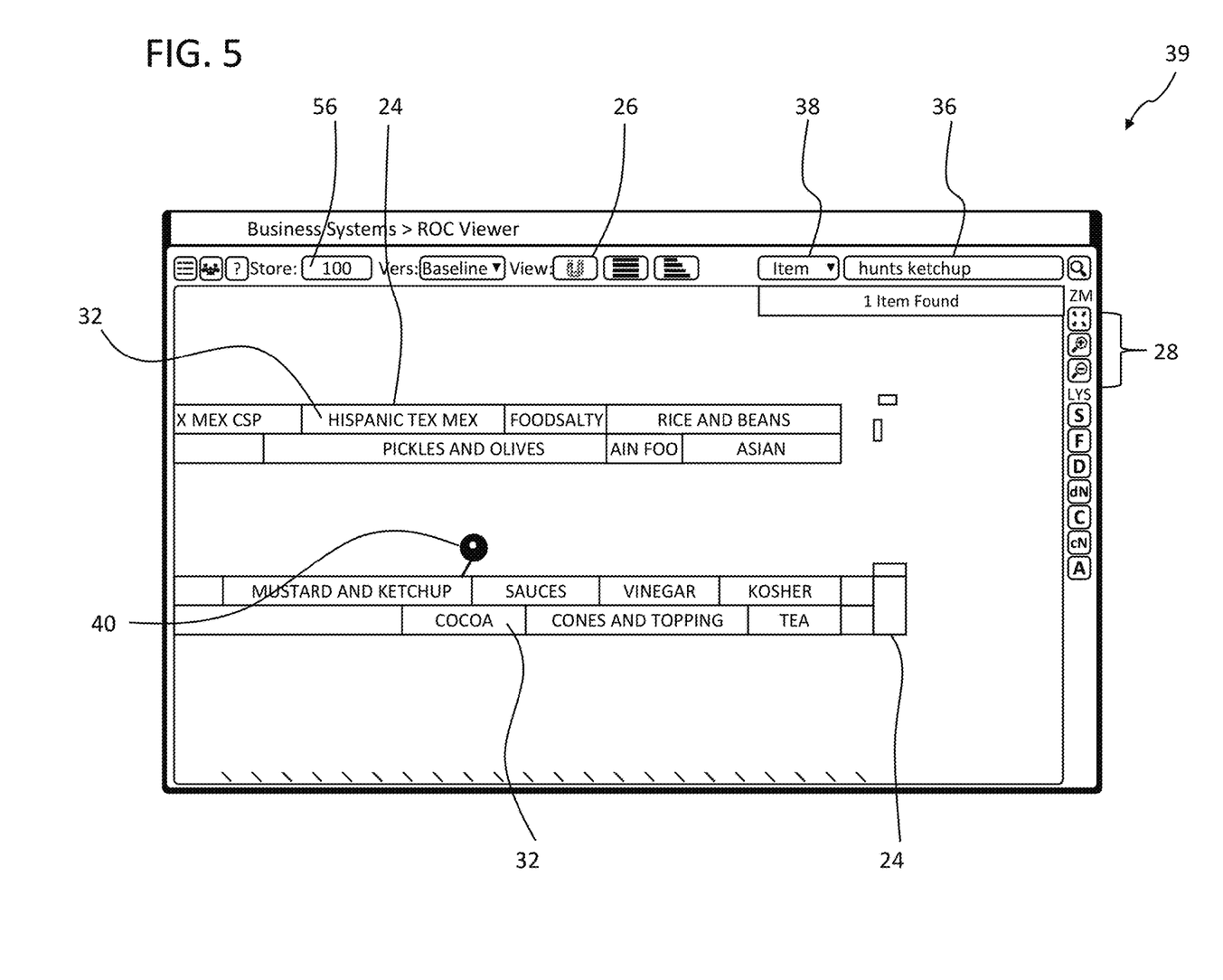
FIG. 5 is a graphical user interface in accordance with some embodiments.

Any of the GUIs described herein can also include a search field 36, such as that shown in the GUIs 22, 29, 31 of FIGS. 2-4. The search field 36 can further include an associated search type field 38. In a first form, a user can select category in the search type field 38 and then enter a category of product, such as ketchup, and the control circuit 14 can identify where in the retail location 12 products identified in the ketchup category are located. For example, as shown in an example GUI 39 in FIG. 5, the search functionality can identify on the overhead view where the desired product is located, such as by a pin-drop 40 or other marker.

Figure 8:
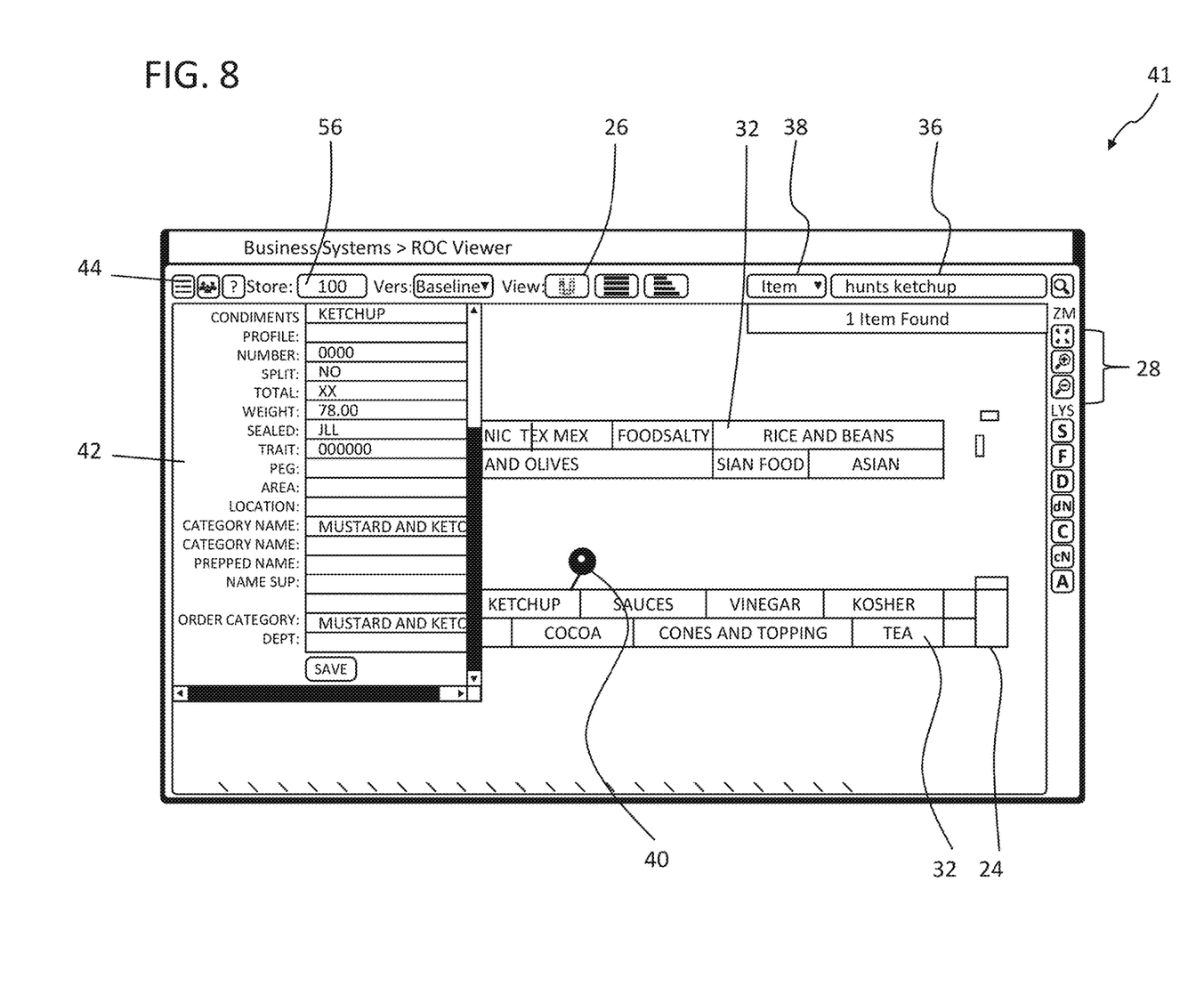
FIG. 8 is a graphical user interface in accordance with several embodiments.

In a second form, a user can select item in the search type field 38 and enter a specific product in the search field 36, and the control circuit 14 can be configured to locate the desired product 34 within the retail location 12. More specifically, using the cubic product representations, the control circuit 14 can provide a location of any desired product that is accurate to the inch. The cubic product representations include the x, y, and z coordinates for every product and include the space occupied by each product. Accordingly, the cubic product representations include an accurate number of product facings 52 to determine a correct width of the product display 24 having the product 34 stocked thereon If desired, a GUI 41 can further provide product profile data for a desired product. As shown in the example GUI 41 of FIG. 8, a product profile window 42 can be accessed by selecting an icon 44. Alternatively, the product profile window 42 can be configured to show in response to a search request. As shown, the product profile data can include the category, category name, dimensions, total number stocked, etc.

One particularly advantageous functionality that can be provided by the management system 10 described herein is that any of the data used to provide the cubic product representations can be edited within one or more the GUIs described herein. For example, a user can change the location of the product displays 24, move the locations of products 34, change the stock amount of products 34, etc. Moreover, if desired, a user can change category titles, add new or remove categories, add new or remove products 34, enter sub-categories, etc. Further, the control circuit 14, upon reception of the edits, can advantageously update the data on the secondary systems 18 so that all of the data on the secondary systems 18 is up-to-date, which saves the time required for a user to run each supplying program on the secondary systems 18 and updating data in the programs individually.

Figure 9:
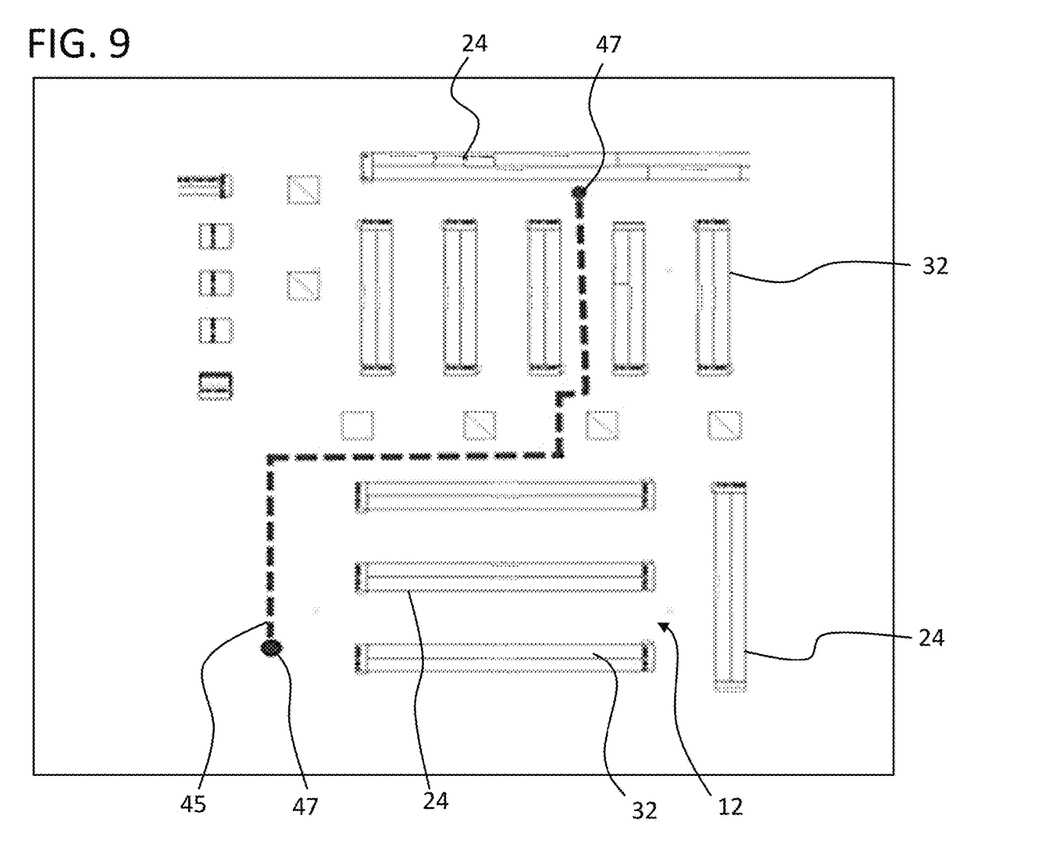
FIG. 9 is a graphical user interface in accordance with some embodiments.

By a further approach, as shown in FIG. 9, the control circuit 14 can provide a path 45 between two points 47 within the retail location 12. More specifically, the control circuit 14 can utilize the geometry data points from the merge of the blueprint and floorplan data, as well as the location data, to create an accurate path between two points within the retail location 12. This functionality can be used, for example, to provide a customer a path 45 between product categories 32, between two products 34, between two departments, between two selected points, and combinations thereof. In one particular example, a customer can enter pasta as a starting point and request a path to home goods. Advantageously, utilizing the geometry data points, the control circuit 14 can provide the shortest path between the two points through the various product displays 24 and other features within the retail location 12.

Figure 10:
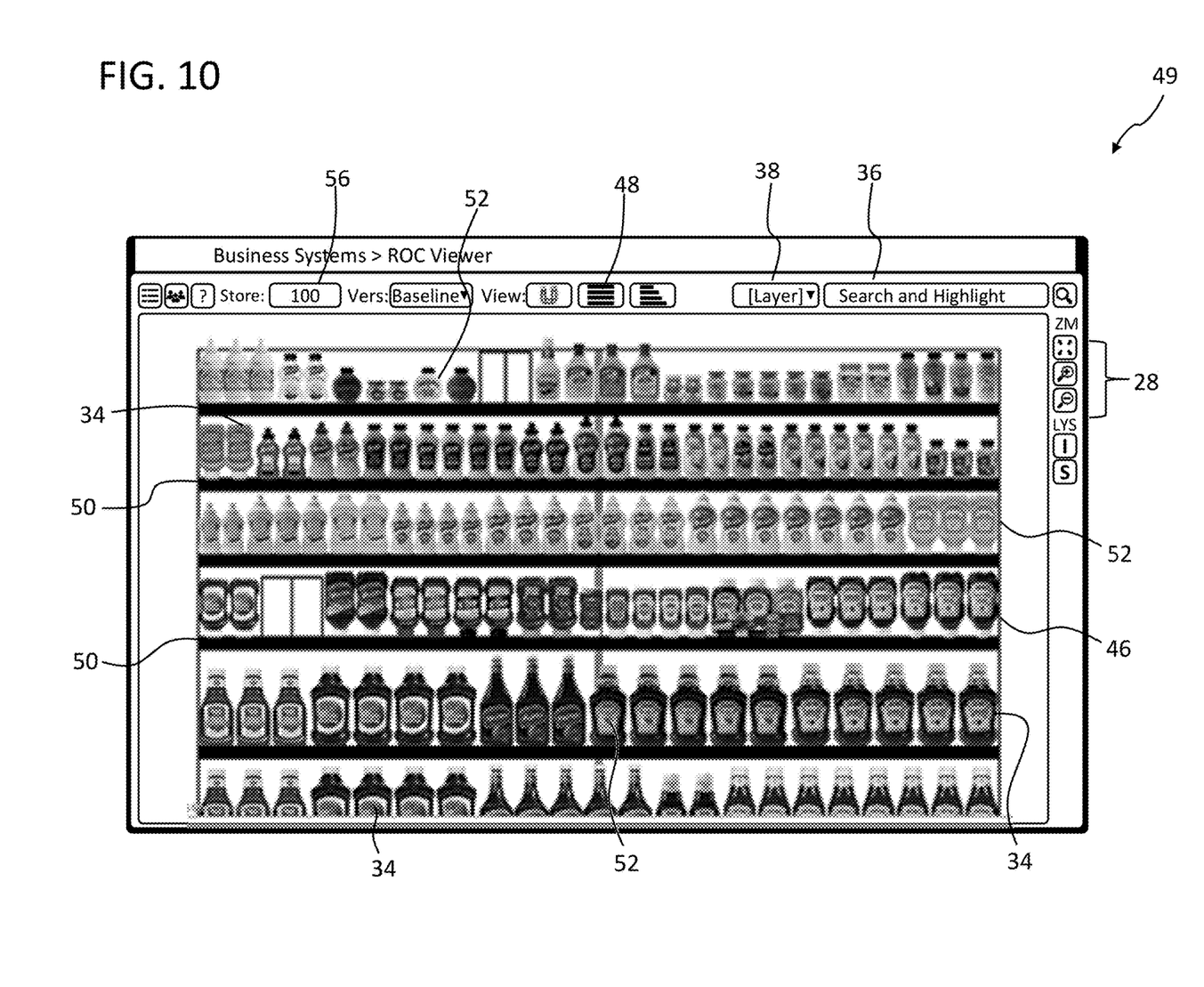
FIG. 10 is a graphical user interface in accordance with several embodiments.
Figure 11:
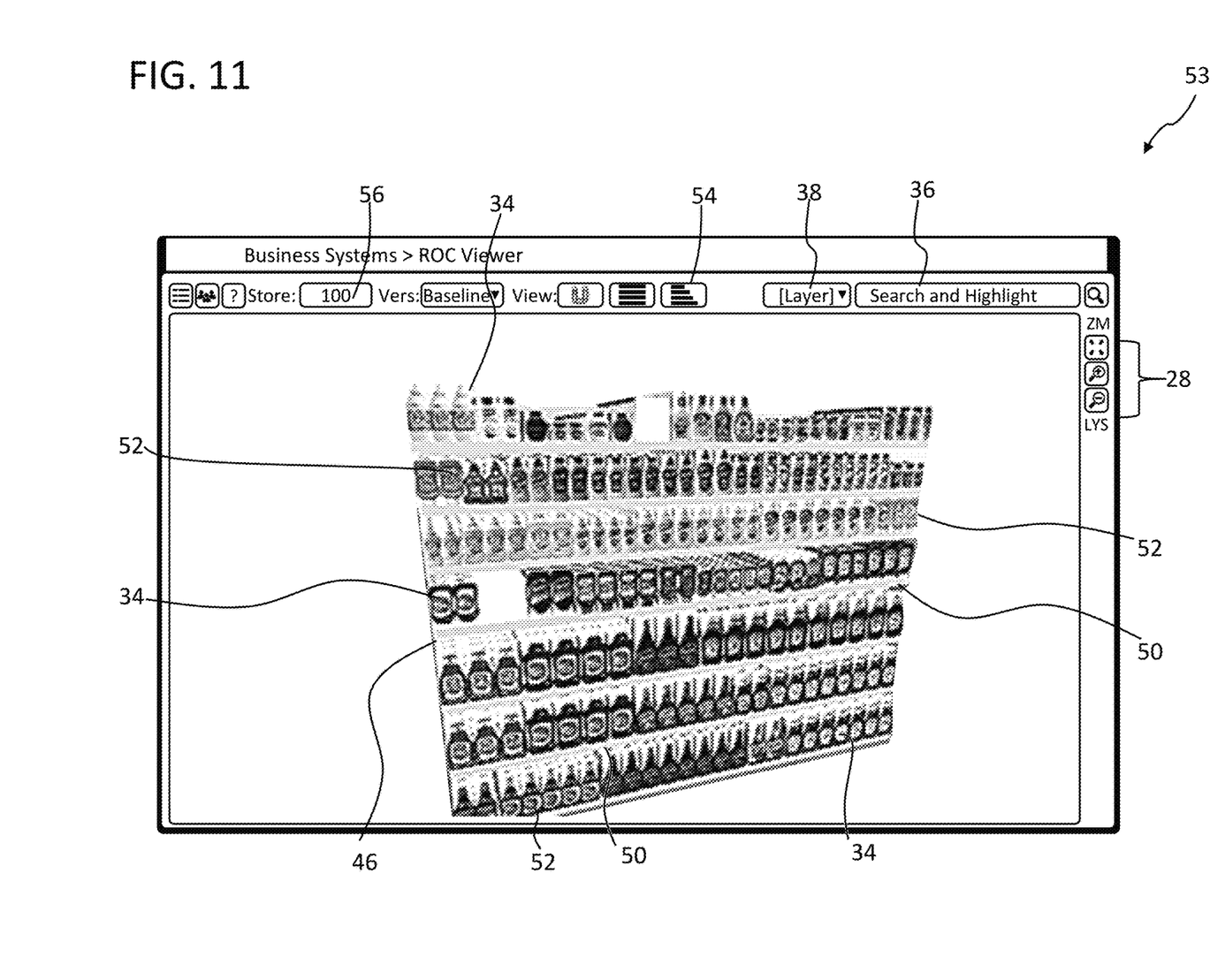
FIG. 11 is a graphical user interface in accordance with some embodiments.

Utilizing the cubic product representations, the control circuit 14 can further provide virtual representations of a particular shelving unit 46 or series of shelving units, within the retail location 12. In a first form as shown in FIG. 10, which can be provided by selection of an icon 48, a GUI 49 can show the desired shelving unit 46 in a side plan view. As illustrated, the shelving unit 46 includes several shelves 50 mounted thereto, and products 34 disposed in product facings 52 as the products 34 would be displayed in the retail location 12. In one form, the control circuit 14 can retrieve or receive images of the products 34 on the desired shelving unit 46, such as from the central database 16 or other storage, and the virtual representation can utilize the images to provide an accurate view of the shelving unit 46. In a second form as shown in FIG. 11, which can be provided by selection of an icon 54, a GUI 53 can show the desired shelving unit 46 in a perspective view. In the perspective view, the depth of facings 52 can be shown in addition to all of the details discussed above with respect to the side plan view. Further, as with the side plan view, the perspective view can utilize product images to provide a real-world representation of the shelf 46.

The management system 10 can also be used for a plurality of retail locations 12. In one approach, a user can enter store identification information, such as a store code or the like, into a store entry field 56 in any of the GUIs described herein. Accordingly, a user can easily transfer between a plurality of locations. This functionality can be used to compare the retail space and layout of the various locations.

Additionally, the cubic product representations can be correlated with other data at the retail location 12 and/or data at other retail locations to compare and/or optimize performance. The management system 10 can be used to analyze the spatial data to optimize the location of a particular product 34 based on where other products fit within the space. In one example, shampoo stocked along five feet of shelf at one store with X amount of sales can be compared to the shampoo stocked along four feet of shelf at another store with Y amount of sales along with the locations of each within both stores.

In another example, sales data can identify whether a particular product 34 has good or poor sales. The sales data can be correlated to the layout, location, and position on the shelving unit 46 of a particular product 34. With poor sales, the system 10 can be utilized to determine whether there is a better location for the product 34 or whether other products can be moved closer to the product 34 to increase sales. Similarly, with good sales, it can be determined whether another location will help aid other products in sales or whether other products can be moved closer to the product 34. In another example, customer traffic can be analyzed with respect to the management system 10 to spread out traffic and lower shopping times by optimizing the location of popular products. In another example, sales data and stock level can be correlated with the data in the management system 10 to determine whether the correct amount of products are being ordered and/or whether the correct amount of shelf space is being committed to a particular product. For example, if a particular product 34 has good sales and is consistently at a low stock level, the retail location 12 can order more of the product 34 and can commit more product display 24 space to the product 34. Similarly, if a particular product 34 has poor sales, the retail location 12 can lower order levels and decrease the amount of shelf space committed to the particular product 34.

In some embodiments, a retail location management system is described herein that includes a control circuit and a central database accessible by the control circuit and configured to store retail space two-dimensional data, spatial data, and product location data for the retail location therein. The control circuit can then be configured to: retrieve the retail space two-dimensional data, the spatial data, and the product location data, create, using the retail space two-dimensional data, the spatial data, and the product location data, cubic product representations within the retail location, store the cubic product representations on the central database, and provide the cubic product representations within the retail location to users via user devices.

By several approaches, the control circuit can be further configured to dynamically provide a virtual representation of a particular shelf at the retail location utilizing the cubic product representations to users via user devices. In one form, the virtual representation can be a three-dimensional virtual representation of the particular shelf. In another form, the virtual representation can be a side plan virtual representation of the particular shelf. In yet another form, the control circuit can further be configured to retrieve product images and the virtual representation can utilize the product images.

By some approaches, the control circuit can further be configured to receive edits to one or more of the retail space two-dimensional data, the spatial data, and the product location data and store the edits in the central database. The edits can then be represented in the cubic product representations. By further approaches, the retail space two-dimensional data, the spatial data, and the product location data can be provided to the central database from one or more secondary systems and the control circuit can be configured to update the retail space two-dimensional data, the spatial data, and the product location data in the secondary systems with the edits.

By several approaches, the control circuit can further be configured to receive a product search query from one of the user devices for a desired product, and identify a location of the desired product within the retail location utilizing the cubic product representations.

Figure 12:
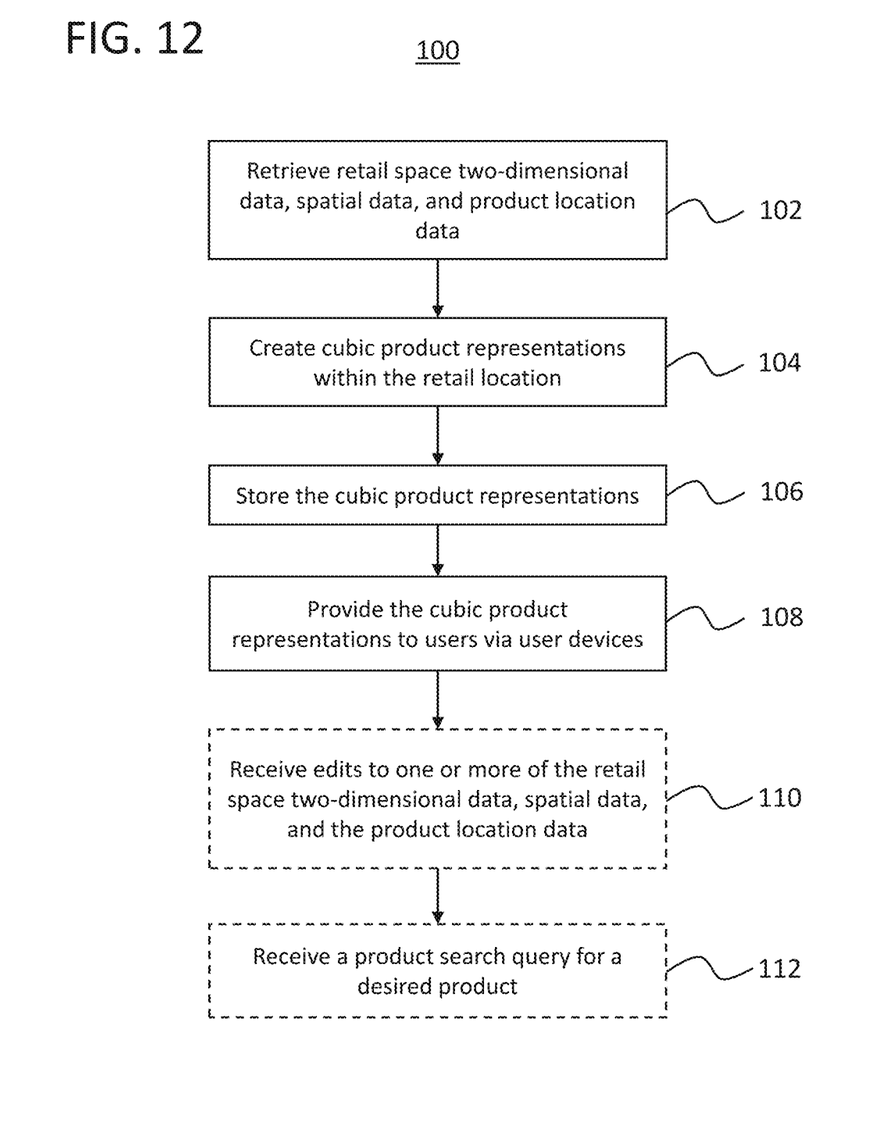
FIG. 12 is a flowchart in accordance with several embodiments.

In several embodiments, a method 100 for providing a retail location management system is described herein and shown in FIG. 12 that includes retrieving 102 retail space two-dimensional data, spatial data, and product location data from a central database with a control circuit, creating 104, using the retail space two-dimensional data, the spatial data, and the product location data, cubic product representations within the retail location with the control circuit, storing 106 the cubic product representations on the central database, and providing 108 the cubic product representations within the retail location with the control circuit to users via user devices.

By some approaches, creating the cubic product representations includes resolving each category space of width, height, and length within a blueprint to a corresponding modular of equal dimensions and an optional assortment identifier or trait. Creating can then include calculating the rotation and offset of the modular per a rotation and insertion point of the category in the blueprint. Further, for each facing of a product in the modular, creating can include translating and rotating each point in the geometry collection of the product per the offset and insertion point of the blueprint.

By some approaches, providing the cubic product representations within the retail location includes dynamically providing a virtual representation of a particular shelf at the retail location to users via user devices utilizing the cubic product representations. In one form, providing the virtual representation of the particular shelf can include providing a three-dimensional virtual representation of the particular shelf. In another form, providing the virtual representation of the particular shelf can include providing a side plan virtual representation of the particular shelf. In yet another form, the method can include retrieving product images with the control circuit, and providing the virtual representation of the particular shelf can include providing a virtual representation utilizing the product images.

By several approaches, the method can further include receiving 110 edits from one of the user devices to one or more of the retail space two-dimensional data, the spatial data, and the product location data, the edits being represented in the cubic product representations, and storing the edits in the central database. By further approaches, the retail space two-dimensional data, the spatial data, and the product location data can be provided to the central database from one or more secondary systems; and the method can further include updating the retail space two-dimensional data, the spatial data, and the product location data in the secondary systems with the edits with the control circuit.

By some approaches, the method can further include receiving 112 a product search query for a desired product from one of the user devices and identifying a location of the desired product within the retail location utilizing the cubic product representations.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail location management system, the system comprising:
   a control circuit:
   a central database accessible by the control circuit and configured to store retail space two-dimensional data, spatial data, and product location data for the retail location;
   wherein the control circuit is configured to:
   retrieve the retail space two-dimensional data, the spatial data, and the product location data;
   create, using the retail space two-dimensional data, the spatial data, and the product location data, a two-dimensional overhead graphical representation (GUI) configured to display an overhead view of at least a portion of the retail location and the overhead GUI comprising: a two-dimensional representation of at least a portion of at least a first product display of multiple product displays, and further identifying multiple primary product categories of multiple different product categories, wherein the multiple primary product categories are spaced along the portion of the first product display that displays products for sale at the retail location, and define, in creating the overhead GUI, locations relative to the first product display of multiple secondary categories of additional products, wherein each of the multiple secondary categories is hidden in the overhead GUI by at least one of the primary product categories;

create, using the retail space two-dimensional data, the spatial data, and the product location data, three-dimensional cubic product representations within the retail location;

store the cubic product representations on the central database;

provide the overhead GUI to users via user devices; and provide the cubic product representations within the retail location to the users via the respective user devices.

2. The system of claim 1, wherein the control circuit is further configured to:

dynamically provide, in response to detecting a selection through a first user device of the user devices of a perspective view icon, a three-dimensional perspective view virtual representation of at least a portion of the first product display at the retail location utilizing the cubic product representations to a first user of the users via the first user device; and dynamically provide, in response to detecting a selection through the first user device of a plan view icon, a plan view virtual representation of at least the portion of the first product display at the retail location utilizing the cubic product representations the first user via the first user device.

3. The system of claim 2, wherein the control circuit is further configured to retrieve product images; and each of the perspective view virtual representation and the plan view virtual representation utilizes the product images.

4. The system of claim 1, wherein the control circuit is further configured to receive, from a first user of the users through the overhead GUI via a first user device of the user devices, edits to one or more of the retail space two-dimensional data, the spatial data, and the product location data and store the edits in the central database, the edits being represented in the cubic product representations.

5. The system of claim 4, wherein the retail space two-dimensional data, the spatial data, and the product location data is provided to the central database from one or more secondary systems; and the control circuit is configured to update the retail space two-dimensional data, the spatial data, and the product location data in the secondary systems with the edits.

6. The system of claim 1, wherein the control circuit is further configured to:

receive a product search query from one of the user devices for a desired product; and identify a location of the desired product within the retail location utilizing the cubic product representations.

7. The system of claim 6, wherein the location of the desired product is accurate to the inch.

8. The system of claim 1, wherein the retail space two-dimensional data comprises blueprint data and the spatial data comprises floorplan data, modular data, and product dimensional data.

9. The system of claim 1, wherein the control circuit is further configured to define, relative to an origin location defined on the first product display, facing locations for each product of a set of products of the primary category based on dimensions of each product defined to be positioned on the first product display.

10. The system of claim 1, wherein the control circuit is further configured to define facing locations of each product on the first product display of a set of the multiple different product categories by translating and rotating each point in a geometry collection of a product per an offset and an insertion point defined in the retail space two-dimensional data an relative to an origin defined for the first product display.

11. The system of claim 1, wherein the control circuit, in creating the overhead GUI is configured to cause the overhead GUI to display a secondary category icon indicating that the multiple secondary categories are defined and hidden, and to cause at least a first secondary product category to be displayed in the overhead GUI relative to a respective location relative to the first product display in response to detecting a selection, by a first user of the users through a first user device of the user devices, of the secondary category icon.

12. A method for providing a retail location management system, the method comprising:

by a processor-based control circuit communicatively coupled with a central data base:

retrieving retail space two-dimensional data, spatial data and product location data from the central database with the control circuit;

creating, using the retail space two-dimensional data, the spatial data, and the product location data, a two-dimensional overhead graphical representation (GUI) configured to display an overhead view of at least a portion of the retail location and the overhead GUI comprising: a two-dimensional representation of at least a portion of at least a first product display of multiple product displays, and further identifying multiple primary product categories of multiple different product categories, wherein the multiple primary product categories are spaced along the portion of the first product display that displays products for sale at the retail location, and defining, in creating the overhead GUI, locations relative to the first product display of multiple secondary categories of additional products, wherein each of the multiple secondary categories is hidden in the overhead GUI by at least one of the primary product categories;

creating, using the retail space two-dimensional data, the spatial data, and the product location data, three-dimensional cubic product representations within the retail location with the control circuit;

storing the cubic product representations on the central database;

providing the overhead GUI to users via user devices; and providing the cubic product representations within the retail location with the control circuit to the users via the respective user devices.

13. The method of claim 12, wherein providing the cubic product representations within the retail location comprises dynamically providing, in response to detecting a selection through a first user device of the user devices of a perspective view icon, a three-dimensional perspective view virtual representation of at least a portion of the first product display at the retail location to users via user devices utilizing the cubic product representations to a first user of the users via the first user device; and dynamically providing, in response to detecting a selection through the first user device of a plan view icon, a plan view virtual representation of at least the portion of the first product display at the retail location utilizing the cubic product representations the first user via the first user device.

14. The method of claim 13, wherein providing the virtual representation of the particular shelf further comprises:

retrieving product images with the control circuit; and providing each of the perspective virtual representation and the plan view virtual representation utilizing the product images.

15. The method of claim 12, further comprising:
receiving, from a first user of the users through the overhead GUI via a first user device of the user devices, edits from one of the user devices to one or more of the retail space two-dimensional data, the spatial data, and the product location data, the edits being represented in the cubic product representations; and
storing the edits in the central database.

16. The method of claim 15, wherein the retail space two-dimensional data, the spatial data, and the product location data is provided to the central database from one or more secondary systems; and further comprising updating the retail space two-dimensional data, the spatial data, and the product location data in the secondary systems with the edits with the control circuit.

17. The method of claim 11, further comprising:
receiving a product search query for a desired product from one of the user devices; and
identifying a location of the desired product within the retail location utilizing the cubic product representations.

18. The method of claim 17, wherein the location of the desired product is accurate to the inch.

19. The method of claim 11, wherein retrieving the retail space two-dimensional data and the spatial data comprises retrieving blueprint data, floorplan data, modular data, and product dimensional data.

* * * * *

UNITED STATES PATENT AND TRADEMARK OFFICE
CERTIFICATE OF CORRECTION

PATENT NO. : 10,885,577 B2
APPLICATION NO. : 15/625273
DATED : January 5, 2021
INVENTOR(S) : Jon Parker et al.

Page 1 of 1

It is certified that error appears in the above-identified patent and that said Letters Patent is hereby corrected as shown below:

In the Claims

At Column 10, Line 2, Claim 10, delete "data an" and replace with --data and-- before "relative to".

At Column 10, Line 5, Claim 11, delete "GUI" and replace with --GUI,-- after "overhead".

At Column 10, Line 17, Claim 12, delete "data base:" and replace with --database:-- after "a central".

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*